United States Patent
Cartarius et al.

(10) Patent No.: US 10,238,998 B2
(45) Date of Patent: *Mar. 26, 2019

(54) BACKFLUSH FILTER AND FILTER INSERT FOR THE LATTER

(71) Applicant: Boll & Kirch Filterbau GmbH, Kerpen (DE)

(72) Inventors: Karsten Cartarius, Vettweiss (DE); Andreas Finsel, Köln (DE); Willi Rott, Bornheim (DE)

(73) Assignee: Boll & Kirch Filterbau GmbH, Kerpen (DE)

( * ) Notice: Subject to any disclaimer, the term of this patent is extended or adjusted under 35 U.S.C. 154(b) by 117 days.

This patent is subject to a terminal disclaimer.

(21) Appl. No.: 15/313,361

(22) PCT Filed: Jun. 10, 2015

(86) PCT No.: PCT/IB2015/054369
§ 371 (c)(1),
(2) Date: Nov. 22, 2016

(87) PCT Pub. No.: WO2015/189774
PCT Pub. Date: Dec. 17, 2015

(65) Prior Publication Data
US 2017/0128860 A1    May 11, 2017

(30) Foreign Application Priority Data

Jun. 11, 2014 (DE) .................... 20 2014 102 704 U
Sep. 5, 2014 (DE) .................... 20 2014 104 200 U

(51) Int. Cl.
*B01D 29/68* (2006.01)
*B01D 29/23* (2006.01)
(Continued)

(52) U.S. Cl.
CPC .......... *B01D 29/682* (2013.01); *B01D 29/23* (2013.01); *B01D 29/232* (2013.01);
(Continued)

(58) Field of Classification Search
CPC ...... B01D 29/682; B01D 29/94; B01D 29/23; B01D 29/684; B01D 29/232; F02M 37/22
(Continued)

(56) References Cited

U.S. PATENT DOCUMENTS

| | | | | |
|---|---|---|---|---|
| 4,518,501 A | * | 5/1985 | Lennartz ............... | B01D 29/23 210/411 |
| 2006/0016745 A1 | * | 1/2006 | Nguyen ................ | B01D 27/06 210/440 |

(Continued)

FOREIGN PATENT DOCUMENTS

DE    202013102503 U1    9/2014

OTHER PUBLICATIONS

International Search Report of PCT/IB2015/054369 dated Sep. 17, 2015.
(Continued)

*Primary Examiner* — Madeline Gonalez
(74) *Attorney, Agent, or Firm* — Rankin, Hill & Clark LLP

(57) ABSTRACT

A backflush filter for liquid media, having a filter housing, which is formed by means of at least one supporting cage, which has at least two groups of slot-type apertures, and at least one filtering means supported on the supporting cage, where-in the apertures of each group extend in parallel alignment with one another and are separated from one another by ribs, and having a backflushing device, which is arranged in the interior of the filter insert, is rotatable and has at least one slit, said backflushing device being designed for flushing of the filtering means via the slit and apertures. The
(Continued)

direction of motion of the backflushing device can be reversed during the backflush cycle and a filter insert therefore, wherein the backflush filter and the filter insert include a filtering means having a pleated, preferably multi-ply, filter fabric or filter cloth with pleating folds, and the ribs fit by means of a rib front into respective pleating folds.

18 Claims, 9 Drawing Sheets

(51) Int. Cl.
*F02M 37/22* (2019.01)
*B01D 29/94* (2006.01)
(52) U.S. Cl.
CPC ............ *B01D 29/684* (2013.01); *B01D 29/94* (2013.01); *F02M 37/22* (2013.01)

(58) Field of Classification Search
USPC .......... 210/411, 232, 493.1, 493.2, 487, 405, 210/359, 333.01, 393
See application file for complete search history.

(56) References Cited

U.S. PATENT DOCUMENTS

2013/0306546 A1 11/2013 Cartarius et al.
2014/0021124 A1* 1/2014 Malgorn ................ B01D 29/13
210/323.1

OTHER PUBLICATIONS

Espacenet bibliographic data for DE Publication No. 2013102503 published Sep. 12, 2014, 3 pages.

* cited by examiner

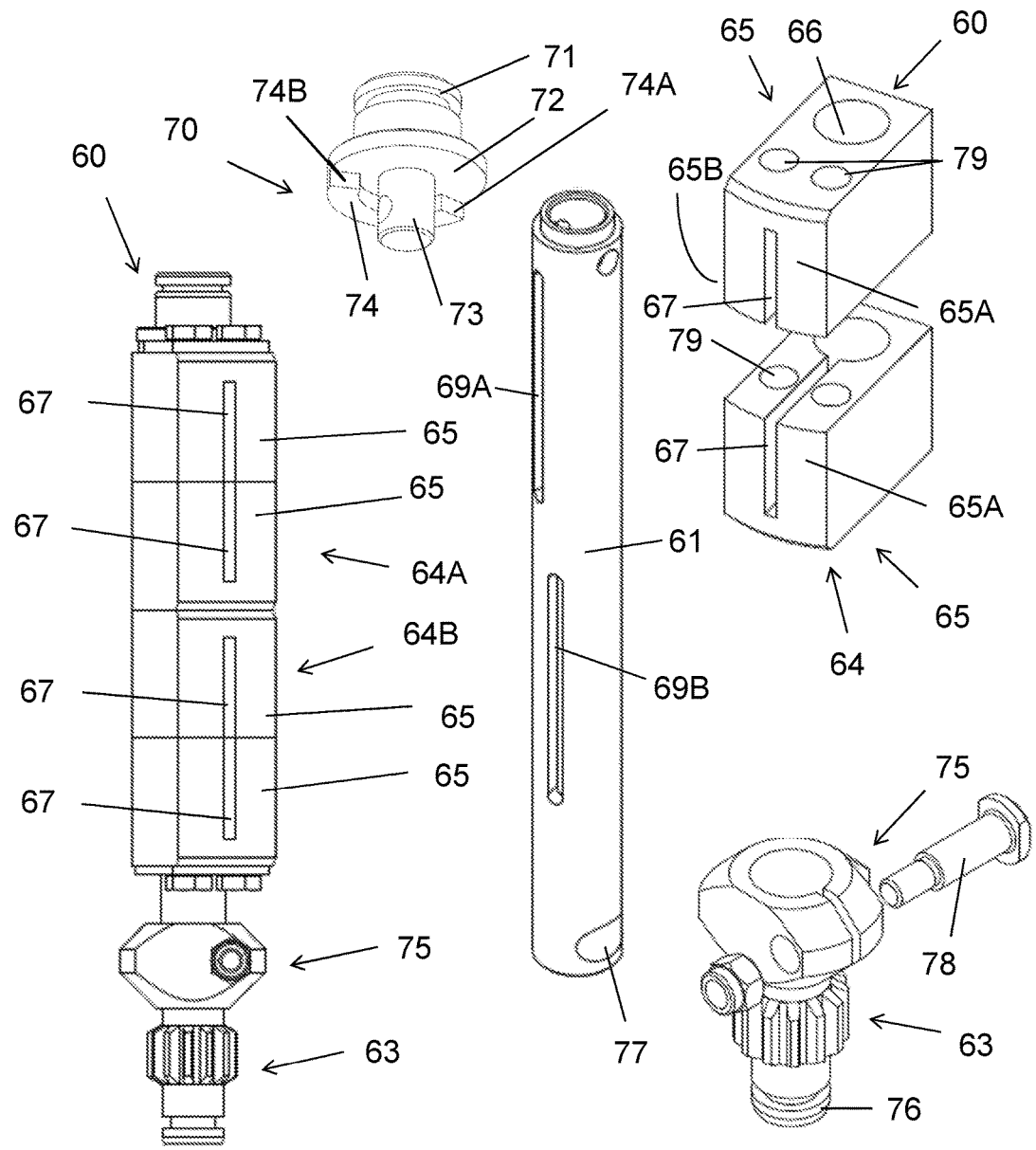

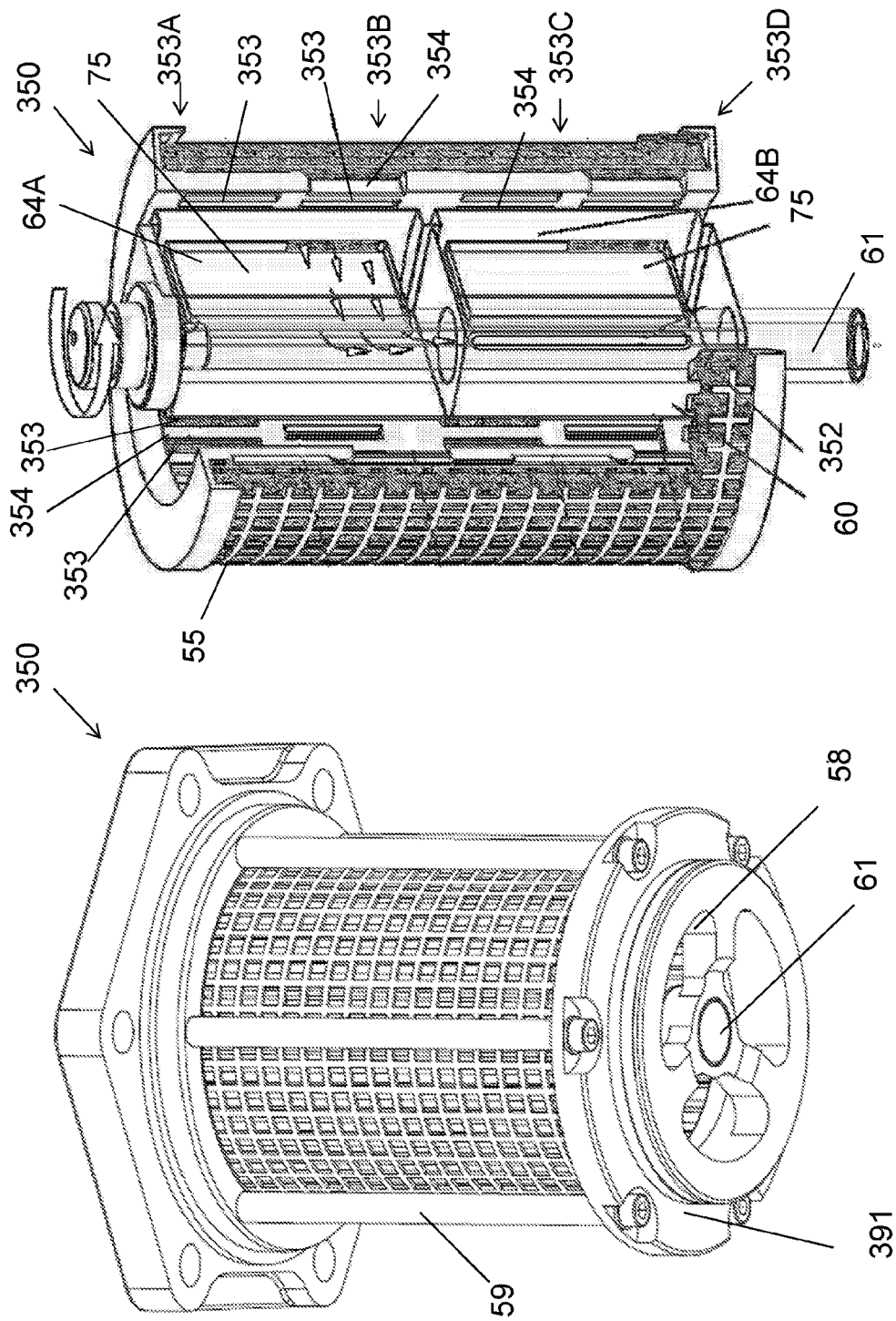

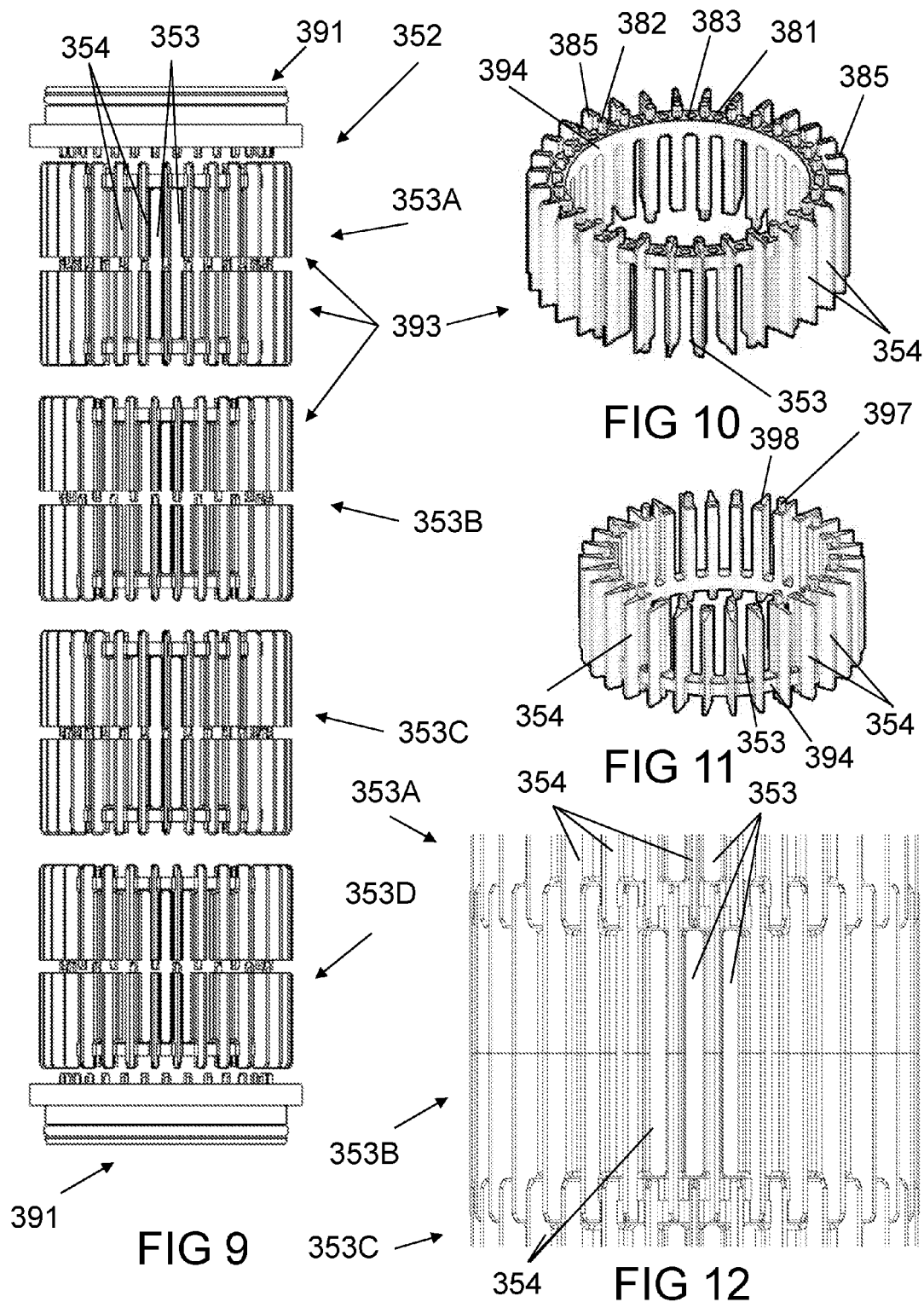

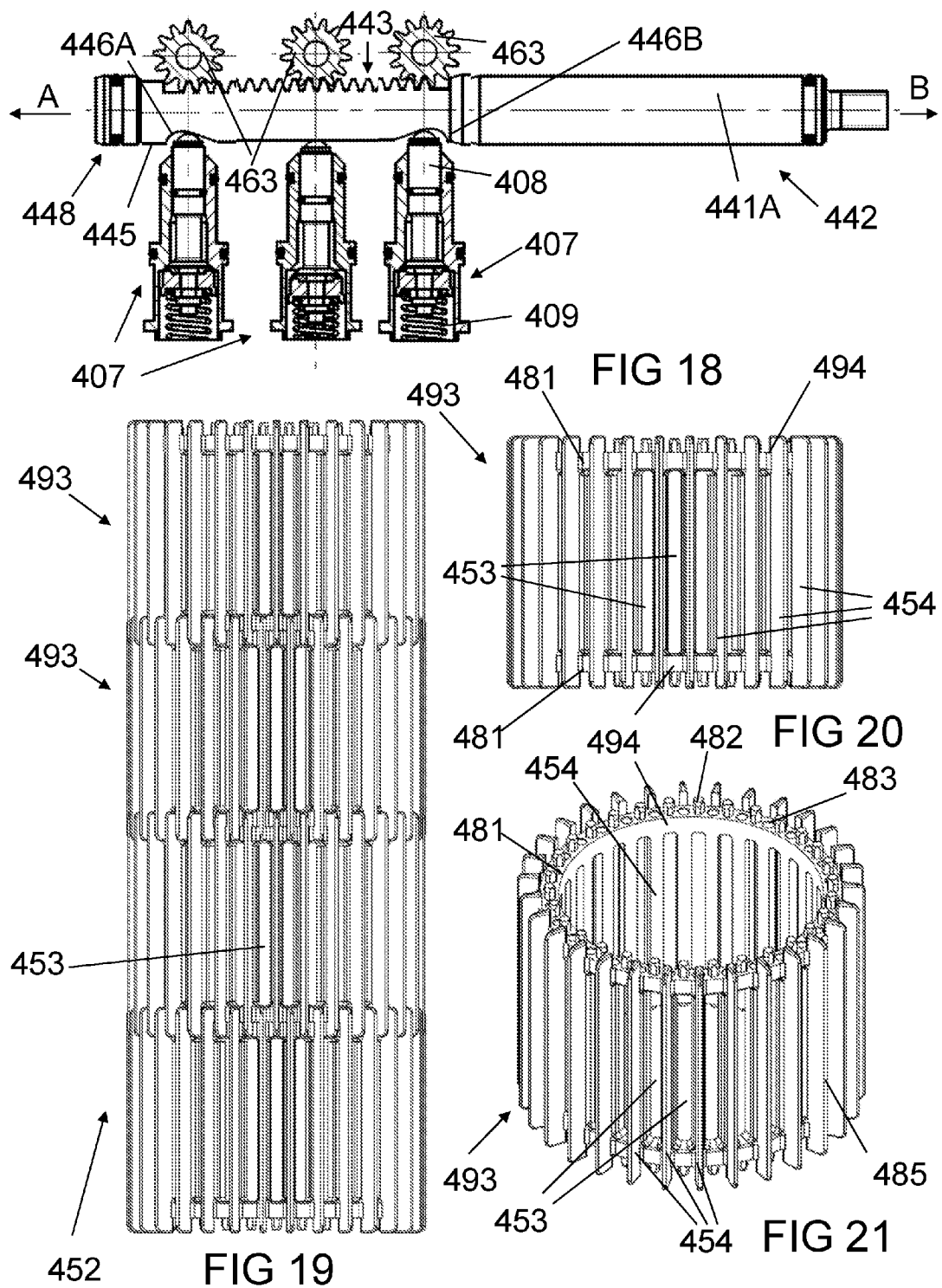

BACKFLUSH FILTER AND FILTER INSERT FOR THE LATTER

The invention relates to a backflush filter for liquid media, especially for liquid fuels, having a filter housing that has a filter inlet, a filter outlet and a flushing connection, having a filter insert, which is fixedly arranged in the filter housing, through which the medium to be filtered flows from the inside to the outside and which is formed by means of at least one supporting cage, which has at least two groups of slot-type apertures, and at least one filtering means supported on the supporting cage, wherein the apertures within each group extend in parallel alignment with one another and are separated from one another by mutually parallel ribs of the supporting cage, and having a backflushing device, which is arranged in the interior of the filter insert, is rotatable in the filter insert about a longitudinal axis of the filter by means of an actuating drive, has at least one slit and extends over the height of the filter insert, said backflushing device being designed for zone-wise flushing of the filtering means via the slit and apertures and for carrying filter residues to the flushing connection during a backflush cycle, wherein the slot-type apertures of one group are preferably arranged offset relative to those of the other group(s), and the apertures of one group lie in a common plane with the ribs of the other group(s). The invention furthermore also relates to a filter insert for a backflush filter, having a supporting cage for supporting a filtering means, wherein the supporting cage has at least two groups of slot-type apertures, which, within each group, extend in parallel alignment with one another and are separated from one another by mutually parallel ribs of the supporting cage, wherein the slot-type apertures of one group are preferably arranged offset relative to those of the other group(s), and the apertures of one group lie in a common plane with the ribs of the other group.

BACKGROUND OF THE INVENTION

The invention starts from a backflush filter in accordance with DE 32 35 552 C2. The citation mentioned already describes the fundamental construction of a backflush filter having a filter insert that has a supporting cage with apertures which are arranged in groups that are offset relative to one another. DE 32 35 552 C2 describes a first embodiment, in which all the rectangular apertures extend with their longer side in the circumferential direction of the filter insert or in a plane perpendicular to the filter insert axis and in which the backflushing device is designed as a cylindrical flushing plate which can be moved up and down within the filter insert by means of a connecting rod. In a second embodiment, the individual apertures are aligned axially, i.e. the longitudinal side of the rectangular apertures extends parallel to the longitudinal axis of the filter insert, and the flushing device consists of a rotatable flushing arm. In order to clean the filtering means behind the various aperture groups by a reverse flow in the case of the last-mentioned embodiment with axially aligned apertures, the flushing arm has a plurality of slits, to each of which a separate shut-off valve is assigned, wherein the shut-off valves are controlled alternately so that in each case one of the flushing ducts is shut off from the flushing connection.

SUMMARY OF THE INVENTION

It is an object of the invention to simplify the design of the backflush filter of the type in question and to improve the intensity of reverse flow at the filtering means in the backflush cycle, especially when the available filtering surface area in the filter insert is increased.

To achieve the abovementioned object, and others, the invention proposes, for a backflush filter of the type in question, that the backflushing device has at least two mutually separate flushing chambers, arranged vertically offset relative to one another and having associated slits, and a hollow shaft, which is capable of limited rotary motion relative to the flushing chambers and has a first radial outlet in the region of the first flushing chamber and a second radial outlet in the region of the second flushing chamber, which second radial outlet is arranged on the hollow shaft in a manner vertically offset and circumferentially offset relative to the first radial outlet, wherein the direction of movement of the backflushing device can be reversed by means of the actuating drive during the backflush cycle, and driving means for simultaneous movement of the flushing device and the hollow shaft in the respective direction of motion after a reversal of direction and for rotation of the hollow shaft and the flushing chambers relative to one another are provided for both directions of motion. The invention starts from a rotatable backflushing device, wherein, for the backflush process, the embodiment is such that the direction of motion of the backflushing device can be reversed or is reversed by means of the actuating drive during the backflush cycle. By means of this reversal of direction and by means of the construction of a backflushing device with a hollow shaft and flushing chambers, between which there can be a relative rotation during or after a reversal of direction, it is achieved in a manner that is simple in terms of design that either only one flushing chamber or a first group of flushing chambers or another flushing chamber or a second group of flushing chambers is active, while the other flushing chamber(s) in each case is/are inactive, wherein furthermore, according to the invention, the filtering means comprises a pleated, preferably multi-ply, filter fabric or filter cloth with pleating folds, and all the ribs fit by means of a rib front into respective pleating folds.

According to a preferred embodiment, the arrangement is such that the hollow shaft is coupled for conjoint rotation to the actuating drive, wherein coupling is preferably accomplished by means of a geared mechanism. In particular, the actuating drive can comprise a rack capable of linear motion, which meshes with a gearwheel coupled to the backflushing device for rotation of the backflushing device, wherein the actuating drive preferably comprises a pneumatic linear drive. According to the embodiment which is especially preferred, the gearwheel is connected for conjoint rotation to the hollow shaft, which, in turn, then drives the flushing chambers via the driving means after a reversal of direction.

For an optimized backflush cycle, a flushing valve, which can be opened by means of a movement of the actuating drive, in particular of the rack, can furthermore be assigned to the sludge outlet in the backflush filter according to the invention. Opening and closing can be effected either in such a way that closure takes place only when the actuating drive or rack returns to an initial position or the arrangement can be such that closure of the flushing valve takes place in each case at the end of each movement in one direction or the other. Through mechanical coupling of the opening and closing process of the flushing valve with the movement of the actuating drive or rack, it is possible in a simple manner to ensure that the flushing valve always opens when the backflushing device is performing a backflush cycle, and, at the same time, is closed when no backflush cycle is taking place and/or an open flushing valve is not advantageous owing to the reversal of direction. Closing the flushing valve at the point of reversal of the actuating drive allows a further reduction in the flushing volume. According to an advantageous embodiment, the rack can for this purpose be provided on its end face with a switching cam or switching surface for actuating the flushing valve. In particular, the flushing valve can be capable of being moved into an open position during the backflush cycle by means of the rack, counter to the restoring force of a return spring, whereby the force produced in the return spring during the opening of the flushing valve can ensure automatic closure of the flushing valve when the actuating device or rack returns to its initial position.

As an alternative, the rack can be provided with two cam surfaces as switching cams for actuating the flushing valve, wherein the first switching cam is used to actuate the flushing valve in the initial position of the rack and the second cam surface or second switching cam is used to actuate the flushing valve in the reverse position of the rack or of the actuating drive. Particularly in the embodiment with two cam surfaces, it is particularly advantageous if both ends of the rack are guided and/or supported in respective sliding guides, which, irrespective of the sliding position, effect sealing relative to the filter housing through which the medium can flow, since the movement of the flushing arm is then independent of the operating pressure of the medium to be filtered.

In order to obtain a long, maintenance-free operating time of a backflush filter, it is furthermore advantageous if the flushing chamber(s) can be rotated by at least 360 degrees in both directions of motion by means of the actuating device during a backflush cycle, preferably by more than 360 degrees, in particular by 360 degrees plus at least the arc length of a number of ribs and apertures such that the flow is fully formed at all apertures during a 360° rotation.

As a further preferred possibility, each flushing chamber and the associated slit can have a height which extends exactly or substantially exactly over the height of in each case one group of the slot-type apertures arranged offset relative to one another. Consequently, each flushing chamber has a flushing gap as an inlet, the height of which is matched to the longer side of the slot-type apertures in the supporting cage. In a construction which is particularly simple in terms of design, the flushing chambers comprise chamber modules of the same type, which are connected detachably to one another, wherein two chamber modules in each case are assembled to form a double chamber, wherein a separating disc is preferably positioned between two chamber modules of a double chamber. By means of the separating discs, the flushing chambers of a double chamber are consequently separated from one another. It is particularly advantageous if all the chamber modules are connected by means of through-rods to form a flushing chamber insert, which is supported with the ability for partial rotary motion on the hollow shaft. In this embodiment, the flushing inlets of all the flushing chambers can lie on a common axial line since the relative position of the hollow shaft, on the one hand, and the flushing chamber insert, on the other, determines which of the flushing chambers is connected via a radial outlet in the hollow shaft to the flushing connection and which flushing chambers are inactive at any given time.

It is particularly advantageous if the filter insert has a plurality of subgroups, wherein each subgroup comprises a group of first apertures and a group of second apertures, and the hollow shaft has precisely two radial outlets positioned in a circumferentially offset and vertically offset manner, wherein the first radial outlet is preferably assigned to the uppermost subgroup(s) and the second radial outlet is preferably assigned to the lower subgroup(s). If an uneven number of subgroups is present, the upper radial outlet can then be assigned only to that group of apertures of the central subgroup which is positioned higher, and the radial outlet which is positioned lower, or lower radial outlet, can additionally be assigned to the lower group of apertures of the central subgroup.

According to the invention, the filtering means in the filter insert in the backflush filter comprises a pleated, preferably multi-ply, filter fabric or filter cloth with pleating folds, and furthermore all the ribs fit by means of a rib front into a pleating fold. It is particularly advantageous here if the rib front of each rib extends as far as the fold base of a pleating fold. By means of this embodiment, the pleated filtering means can be fixed by means of the ribs of the supporting cage, wherein, at the same time, stray flows from the side into the apertures are avoided by means of the ribs entering the pleating folds. Each pleating fold can preferably be assigned a plurality of apertures of different groups of first apertures or of second apertures. Inasmuch as the ribs of the next or other group are situated on an axial extension of an aperture, stray or bypass flows from above and/or from below within a pleating fold are effectively prevented at the same time. It is particularly advantageous here that fluid is drawn into the flushing chamber via the aperture and the slit during the backflush process, thereby exerting a suction on the pleating folds of the filtering means and bringing about additional sealing of the apertures through which there is an instantaneous reverse flow. It can furthermore be particularly advantageous if all the ribs extend radially and are preferably formed symmetrically with respect to a radial plane, and/or if the rib front of each rib is designed as a rib tip tapering to the free front end thereof, wherein the front end is preferably rounded and is thereby matched to the rounding of the pleating fold.

A particularly simple structural design is also ensured if the supporting cage is of modular construction and has a plurality of mutually identical annular ribbed elements, which are clamped between two end covers, which allow radial sealing by means of a cover rim, wherein each ribbed element is preferably composed of plastic and has at least one base ring, on which a plurality of ribs positioned in a manner circumferentially offset relative to one another are integrally formed or fixed, wherein the supporting cage preferably has an even number of ribbed elements. According to one variant, two ribbed elements in each case can form a ribbed element pair, these being clamped between the end covers with their base rings abutting one another. In this embodiment, it is consequently possible, by using just one type of ribbed element, to produce one subgroup in each case, wherein two groups of aperture openings of the apertures are formed in which said aperture openings are positioned in an offset manner. However, it is also possible for a group or subgroup to be formed completely by means of a ribbed element as a modular component.

According to an advantageous embodiment, the ribs of the ribbed elements can be provided, preferably alternately, at their free rib ends with integrally formed locking pins or locking holes, and the base ring can be provided on one face, if appropriate in a correspondingly alternating manner, with locking pins and locking holes, which interact with one another in the assembled state, wherein the rib fronts of the ribs preferably extend only radially outside the base ring. If the rib fronts of the ribs extend radially outside the base ring, it is particularly advantageous if the rib fronts project upwards and downwards on both sides beyond the faces of the base ring. In this case, the rib fronts can preferably project beyond the face of the base ring which is provided with the locking holes, the projection corresponding to the thickness thereof in the axial direction, with the result that, in the assembled state of two ribbed elements inserted into one another, the rib of the adjacent group extends in an axial direction as far as the aperture of the next group, and support for the pleating fold is also ensured in the adjoining regions of an aperture so as to prevent bypass flows in a particularly effective manner.

As a further preference, the end covers can be connected to one another by means of anchor rods, wherein the supporting shell and the filtering means arranged between the supporting shell and the supporting cage are also arranged, in particular enclosed, between the end covers.

The abovementioned object is also achieved by means of a filter insert of the type in question having a supporting cage for supporting a filtering means, wherein the supporting cage has at least two groups of slot-type apertures, which, within each group, extend in parallel alignment with one another and are separated from one another by mutually parallel ribs of the supporting cage, by virtue of the fact that the filtering means comprises a pleated, preferably multi-ply, filter fabric or filter cloth, and that all the ribs fit by means of a rib front into respective pleating folds. Through the support of the pleated filtering means by means of the ribs, reverse flow is already considerably improved. This is particularly advantageous if, according to the particularly preferred embodiment, the slot-type apertures of one group are arranged offset relative to those of the other group(s), and the apertures of one group lie in a common plane with the ribs of the other group(s), since then bypass flows and stray flows can also be prevented by means of the ribs arranged adjacent to an aperture within the same pleating fold.

According to one embodiment, all the ribs can extend radially and are preferably formed symmetrically with respect to a radial plane, and/or the rib front of each rib can be designed as a rib tip tapering to the free front end thereof, wherein the front end is preferably rounded. Furthermore, each pleating fold can be assigned a plurality of apertures of different groups of first apertures or of second apertures.

As a further preference, the supporting cage of the filter insert can be of modular construction and can have a plurality of mutually identical annular ribbed elements, which are preferably enclosed between two end covers, wherein each ribbed element is preferably composed of plastic and has at least one base ring, on which a plurality of ribs positioned in a manner circumferentially offset relative to one another are integrally formed or fixed, and wherein the supporting cage preferably has an even number of ribbed elements. In a variant, two ribbed elements in each case can form a ribbed element pair, these being clamped between the end covers with their base rings abutting one another. However, it is also possible for one group or subgroup to be formed completely by means of a ribbed element as a modular component. Particularly in this embodiment, it is then advantageous if each ribbed element has two base rings, on which a plurality of ribs positioned in a manner circumferentially offset relative to one another and connecting the base rings to one another are integrally formed or fixed, wherein each base ring is preferably provided in such a way, on its face facing away from the other base ring, with alternate locking pins and locking holes that each ribbed element is formed in mirror symmetry with respect to a mirror plane between the two base rings. When two ribbed elements of identical construction are inserted into one another, an angular offset is then automatically formed between the ribs of the ribbed elements of adjacent groups.

As a further preference, each pleating fold can be assigned a plurality of apertures of the supporting cage, which are situated one above the other. It is particularly advantageous if the ribs of the ribbed elements are provided alternately at their free rib ends with integrally formed locking pins or locking holes, and the base ring is provided alternately on one face with locking pins and locking holes, which interact with one another in the assembled state, wherein the rib fronts of the ribs preferably extend radially outside the base ring. Insofar as the rib fronts of the ribs extend radially outside the base ring, the rib fronts can preferably project upwards and downwards in the axial direction on both sides beyond the faces of the base ring or base rings, wherein the rib fronts preferably project beyond the face of the base ring or base rings which is provided with the locking holes, the projection corresponding to the thickness thereof in the axial direction, as a result of which each pleating fold is supported by means of the ribs up to a point directly adjacent to an aperture.

These and other objects, aspects, features, embodiments and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 3 shows an isolated view of the hollow shaft together with the flushing chambers with a backflush filter according to FIG. 1;

FIG. 4 shows the flushing device according to FIG. 3 in an exploded view;

FIG. 5 shows the filter insert which can be inserted in the backflush filter according to FIG. 1 in a detail perspective view;

FIG. 6 shows the filter insert from FIG. 5 schematically and in a partially cutaway view in the backflush cycle;

FIG. 9 shows an illustrative embodiment of a supporting cage for a filter insert according to the invention schematically in an exploded view;

FIG. 10 shows a ribbed element for the supporting cage according to FIG. 9 in perspective view;

FIG. 11 shows the ribbed element from FIG. 10 in perspective view, rotated through 180°;

FIG. 12 shows three interconnected ribbed elements of a supporting cage according to FIG. 9 for the filter insert according to the invention in side view;

FIG. 18 shows the rack from FIG. 16 with three closing positions of the flushing valve, which are dependent on the position of the rack;

FIG. 19 shows another alternative illustrative embodiment of a supporting cage, formed from four assembled ribbed elements, for a filter insert according to the invention in side view;

FIG. 20 shows an individual ribbed element according to FIG. 19 in side view; and FIG. 21 shows the ribbed element from FIG. 20 in perspective view.

DESCRIPTION OF PREFERRED EMBODIMENTS

Figure 1:
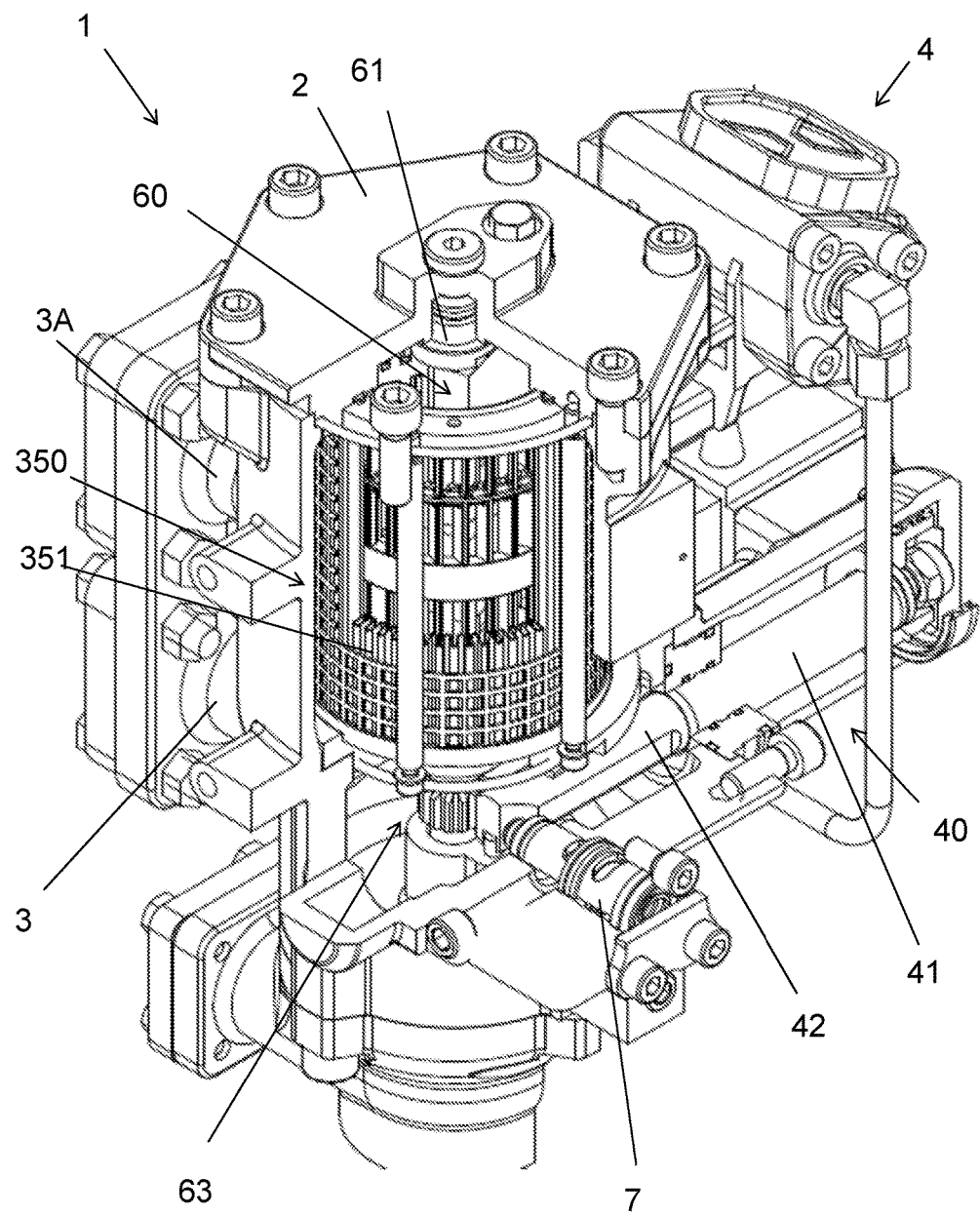
FIG. 1 shows a backflush filter according to the invention in perspective view, the filter being schematically simplified and partially cut away.

Referring now to the drawings wherein the showings are for the purpose of illustrating preferred and alternative embodiments of the invention only and not for the purpose of limiting the same, FIG. 1 shows a backflush filter according to certain aspects of the invention for the reversible flow of liquid media, especially liquid fuels, is denoted overall by the reference sign 1 in FIG. 1. The backflush filter has a filter housing 2, shown only in part, in which all the functional parts for filtering operation to filter a liquid are arranged. The liquid flows into the housing 2 of the backflush filter 1 via a filter inlet 3, passes through a filtering means 351 of a filter insert, which is denoted overall by the reference sign 350 in the figures, and can then be fed as a filtrate to a downstream operating unit, e.g. an engine, via the filter outlet 3A. During this process, the medium to be filtered flows through the filtering means 351 of the filter insert 350 from the inside outwards and, for this purpose, can enter, in particular from below, the interior of the filter insert 350 shown in detail in FIGS. 5 and 6 via the openings 58.

The differential pressure between the filter inlet 3 and the filter outlet 3A can be monitored by means of a differential pressure indicator 4, which is flanged to the filter housing at the side, and cleaning of the filtering means 351 of the filter insert 350 by means of a backflushing device 60 takes place in accordance with the differential pressure and/or in a timed manner, said backflushing device being mounted rotatably on the filter housing 2 and being rotatable both clockwise and anticlockwise by means of an actuating device denoted overall by the reference sign 40. As will be explained below, the backflushing device 60 comprises a central hollow shaft 61, the cavity of which is connected via a system of passages in the filter housing 2 to a flushing connection 6, which is shut off by means of a flushing valve 7 in the pure filtering mode of the backflush filter 1, i.e. when the backflushing device 60 is not in operation. The flushing valve 7 or flushing connection 6 can furthermore be assigned an overflow valve, which opens when pressure peaks are exceeded, if appropriate.

Figure 2:
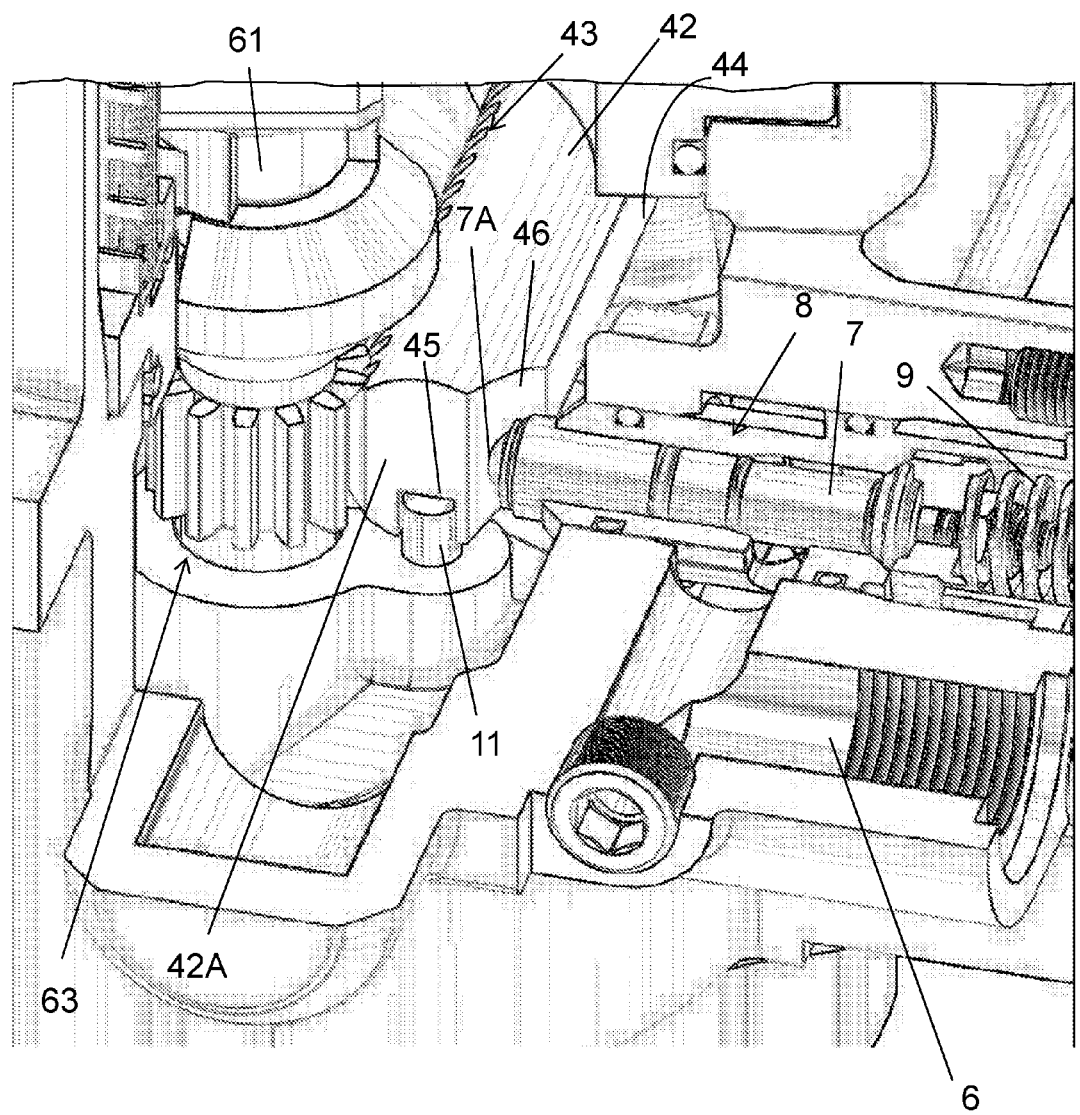
FIG. 2 shows a detail view of the actuating device of the backflush filter from FIG. 1.

In the preferred illustrative embodiment, shown in the figures, of a backflush filter 1, the actuating device 40 comprises a pneumatically actuable piston-type linear actuator 41 capable of linear motion, wherein the piston is coupled to a rack 42 which, although being partially rounded, as can be seen particularly well from FIG. 2, is provided on one flank with a row of teeth 43 and on the opposite flank with a flat 44, while the upper side is rounded and the underside is provided with a guide slot 45. By means of the guide slot 45, the rack 42 is guided on a guide pin 11 in the interior of the filter housing. At the transition to the flat 44, the end face 42A of the rack 42 has a cam surface 46, which is arched or embodied as an oblique ramp and by means of which a switching head 7A of the flushing valve 7 is in contact or comes into contact when the rack 42 moves. The cam surface 46 forms the switching cam for the flushing valve 7, for which purpose the switching head 7A is designed as a spherical head or comprises a steel ball and the cam surface 46 is curved in such a way that, in the initial position of the rack 42 shown in FIG. 2, the valve tappet 8 of the flushing valve 7 is preloaded into a closed position by the restoring force of a spring 9, while the valve tappet 8 adopts its open position when the rack 42 is moved by an amount such that the switching head 7A is resting against the flat 44. By means of this measure, the movement of the backflushing device (60, FIG. 1) and the opening and closing of the flushing valve 7 are motion-coupled, and it is ensured that the flushing valve 7 is always opened and remains open in the backflush cycle as soon as the rack 42 has been moved by a certain amount, until the actuating device has moved the rack 42 back into its initial position shown in FIG. 2.

The set of teeth 43 on the rack 42 meshes with a gearwheel 63, which is coupled for conjoint rotation to the hollow shaft 61 in the illustrative embodiment shown. The path of motion of the actuating device 40 and the number of teeth in the set of teeth 43 on the rack 42 and on the gearwheel 63 are matched to one another in such a way that, after the opening of the flushing valve 7, the backflushing device 60 can be moved further by more than 360 degrees, first of all in one direction of motion—in the clockwise direction in the illustrative embodiment shown—and then, after reversal of the direction of motion of the pneumatic drive of the actuating device 40, in the opposite direction and thus in the anticlockwise direction, once again by more than 360 degrees. Since, as will be explained, the flushing chambers 64 of the backflushing device 60 can be rotated by a certain angle relative to the hollow shaft 61 before they are taken along in one or other direction of motion by driving means in the illustrative embodiment shown, the path of motion of the hollow shaft is considerably more than 360 degrees. The hollow shaft can preferably be rotated by 360° plus backlash between the flushing chambers and the hollow shaft plus the actuating path for opening and closing the flushing valve, wherein an additional path is provided so that the flushing chambers 64 can clean the filter fabric 351 through a further 360 degrees in the driving position when the flushing valve 7 is open. The hollow shaft 61 can therefore preferably be rotated by more than 400 degrees in each direction of motion and/or the rack has at least 15% more teeth than the gearwheel 63.

Reference is now made first of all to FIGS. 3 and 4, in which the backflushing device 60 for the backflush filter according to FIG. 1 is shown in detail. As a central component, the backflushing device 60 has a hollow shaft 61, which here consists of a tube section, which is provided in the illustrative embodiment shown with 2 mutually separate flushing chambers 64A and 64B arranged in a manner vertically offset relative to one another. The upper flushing chamber 64A forms a first double chamber and the lower flushing chamber 64B forms a second double chamber, wherein each double chamber comprises mutually identical chamber modules 65 assembled so as to be offset by 180 degrees relative to one another, and each chamber module 65, as can be seen particularly clearly in FIG. 4, has a through hole 66 for the passage of the hollow shaft 61 and a slot open on one side at the edge as a slit 67 on an end face 65A, projecting laterally relative to the hole 66, of the chamber modules 65. Two chamber modules 65 can be inserted one inside the other to form a double chamber or flushing chamber 64. A separating disc 78 could also furthermore be arranged between two chamber modules 65, which disc would then separate even the respective slots or slits 67 in the individual chamber modules 65 outside the through hole 66, giving rise to four separate flushing chambers. In the exploded view according to FIG. 4, only one of the two double chamber modules assembled from chamber modules 65 is shown. The hollow shaft 61, in turn, is provided with two radial outlets 69A, 69B, which are positioned in a manner circumferentially offset relative to one another and vertically offset relative to one another and the angular offset between which is approximately 26 degrees in the illustrative embodiment shown so that the radial offset ensures that only one of the radially inner ends of the slots or slits 75 is reached by the radial outlets 69A, 69B. The upper radial outlet 69A has a length in the axial direction of the hollow shaft 61 which is matched to the length of the slots or slits 67 of an upper double chamber formed by two chamber modules 65, and the lower radial outlet 69B correspondingly has a length in the axial direction which is matched to the other double chamber. The upper end of the hollow shaft 61 is closed by means of a bearing plug 70, the upper section of which forms a bearing stub 71 for supporting the hollow shaft 61 on the filter housing and which, on its underside 72, is provided, around a closure plug 73 that can be inserted sealingly into the hollow shaft, with a driving ridge 74, which ends in two end edges 74A, 74B, which are offset circumferentially relative to one another and which have an angular spacing from another of, in this case, 206°, matching the angular offset of the radial outlets 69A, 69B. By means of the end edges 74A, 74B, the driving ridge 74 forms driving stops as driving means, by means of which the flushing chambers 64A and 64B, which are arranged on the hollow shaft 61 with a limited capacity for movement in the direction of rotation, are taken along in one or other direction of motion of the hollow shaft 61 when there is a rotation of the flushing device 60 in the event of a reversal of direction. During this process, the end edges 74A, 74B may press against the rear side 65B of the uppermost flushing chamber 64A. All the flushing chambers 64A, 64B or chamber modules 65 are connected to one another in such a way by means of through-rods or screw fasteners, which pass through associated holes 79 in the individual chamber modules 65, to form a flushing chamber insert that all the slots or slits 67 extend in a manner aligned along an axial line, as can be clearly seen from FIG. 3. In the illustrative embodiment shown, the gearwheel 63 with the integrally formed lower bearing stub 76 is fastened for conjoint rotation to the lower end of the hollow shaft 61 by means of a clamping ring 75, for which purpose the hollow shaft 61 is provided with a notch 77 in the edge for the passage of a clamping screw 78. While the gearwheel 63 is therefore connected for conjoint rotation to the hollow shaft 61, the flushing chamber insert is capable of limited rotary motion relative to the hollow shaft 61, namely by an amount equal to the circumferential offset between the radial outlets 69A, 69B, for which reason the lower radial outlet 69B and the slots or slits 67 in the lower flushing chamber 64B are in alignment with one another when the hollow shaft 61 is rotated in one direction, in this case clockwise, as a result of which they are open to the cavity of the hollow shaft 61, whereas, when the backflushing device is rotated in the opposite direction, in this case anticlockwise, the upper radial outlet 69A is correspondingly in alignment and therefore open to the slots and hence slits 67 in the upper flushing chamber 64A. The clearance fit between the outer circumference of the hollow shaft 61 and the hole 66 in the chamber modules 65 is chosen so that, in the case of non-aligned arrangement, essentially no fluid can pass into the radial outlet 69A, 69B angularly offset relative to the slits 67. If a separating disc were additionally to be arranged between two chamber modules, a flushing flow built up by differential pressure could even be concentrated exclusively on the region of action of a chamber module 65 in each case, while, in the illustrative embodiment shown, it acts in each case on a flushing chamber 64A or 64B embodied as a double chamber.

This construction of the backflushing device 60 has a particularly advantageous effect in conjunction with the special construction of the filter insert 350 and especially that of a supporting cage 352 for the filter insert 350, as now explained especially with reference to FIGS. 9 to 15. The filter insert 350 has a supporting cage 352, which is configured in such a way that, once again, four groups 353A, 353B, 353C, 353D of slot-type apertures 353 arranged in a manner vertically offset one above the other are formed in a manner distributed over the height of the filter insert 350. Two adjacent apertures 353 of a group 353A are in each case separated from one another by mutually parallel ribs 354. With reference to group 353A, for example, apertures 353 and ribs 354 thus always alternate in a manner distributed over the circumference. In the adjacent group 353B situated vertically offset relative to group 353A, for example, apertures 353 and ribs 354 likewise alternate, with the arrangement of the ribs 354 in this adjacent group being such that in each case one rib 354 of group 353B lies on an axial extension of an aperture 353 of the adjacent groups 353A and 353C, and vice versa. In the illustrative embodiment shown, this applies to all the groups.

The supporting cage 352 and the four groups 353A to 353D are formed by means of just three different individual parts, namely two end covers 391 of identical construction and, in this case, a total of eight mutually identical ribbed elements 393, wherein in each case two ribbed elements 393 are assembled to form a pair by joining them together in a manner offset by 180° relative to one another, as FIG. 9 clearly shows, in order to form one of the groups 353A to 353D as a ribbed element pair with continuous apertures 353 and ribs 354 within the group. Each ribbed element 393, in turn, is composed of plastic with a base ring 394, on which the individual ribs 354 are formed integrally in such a way that one aperture 353 is formed between two ribs 354 in each case, as can be seen especially clearly from FIGS. 10 and 11. That face of the two faces 381 facing in the axial direction which faces upwards in FIG. 10 is provided alternately in the radial direction, to the inside of the ribs 354, with a locking pin 382 and, in each case between two locking pins 382, with a locking hole 383. As can be clearly seen in FIG. 11, the ribs 354, in turn, are provided alternately on their free rib ends with locking pins 397 and locking holes 398, which, based on the same group, interact with the rib ends of the ribs 354 of the second ribbed element 393 in the assembled state of two ribbed elements 393, as will be clear, for example, from FIGS. 9 and 12, while the locking holes 383 and locking pins 382 on the base ring 394 in each case interact between adjacent groups and engage in one another.

The locking holes 383 and locking pins 382 on the base ring 394 of the respective ribbed elements 393 of the outermost groups 393A, 393D furthermore also interact with corresponding pins and holes on the end covers 391.

As FIGS. 10 to 13 furthermore clearly show, a rib front 385 of each ribbed element 354 in each case extends radially outside the base ring 394. All the ribs 354 extend radially or in a radial direction and they are formed symmetrically with respect to a radial plane which intersects the centre of the supporting cage 352. Each rib front 385, in turn, tapers towards the free front end 386 of the ribs 354 and is designed as a rib tip, wherein the front end 386 is rounded. At the same time, each rib front 385 extends both upwards and downwards in the axial direction relative to the base ring 394, wherein the axial length of the rib 354 or rib front 385 which projects in the axial direction beyond the face 381 of the base ring 394, said face being provided with the locking pins 382 and locking holes 383, is significantly less than on the opposite side of the base ring 394 and corresponds substantially to the thickness of the base ring 394 in the axial direction. This has the effect that the rib 354 of group 353B always extends as far as an aperture 353 of the adjacent groups 353A or 353C and delimits said aperture in the assembled state, as FIG. 15 shows.

Figure 14:
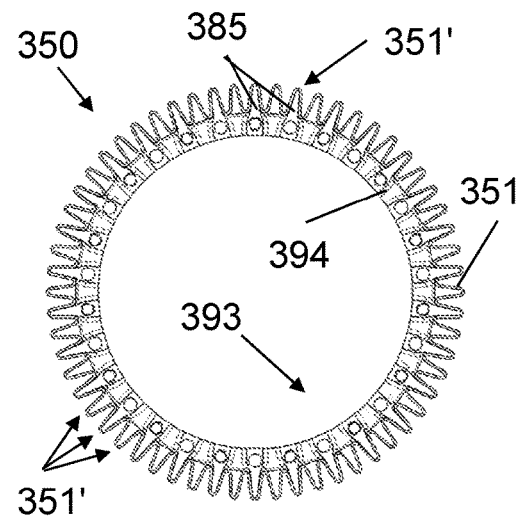
FIG. 14 shows the ribbed element from FIG. 13 with the pleated filtering means mounted thereon.

The embodiment of the supporting cage 352 has particular advantages when using a pleated filtering means 351. FIG. 14 shows the filter insert 350 in a view corresponding to FIG. 13 with a filtering means 351 already supported by means of the supporting cage 352. The filtering means 351 has a multiplicity of pleating folds 351', wherein the number of pleating folds 351' is twice as large in the illustrative embodiment shown as the number of ribs 354 of a ribbed element 393. In this arrangement, each rib 354 enters completely into one of the pleating folds 351' by means of its rib front 385 projecting radially outwards beyond the base ring 394, and very largely or completely fills said pleating fold 351' on the inside of the filtering means 351. Owing to the alternating arrangement of apertures 353 and ribs 354 between two adjacent groups, the respective pleating fold 351' which is not supported by means of the rib fronts 385 of the ribs 354 in one particular group is then nevertheless supported in the adjacent group by the rib situated there, which enters the pleating fold 351' for this purpose.

Figure 15:
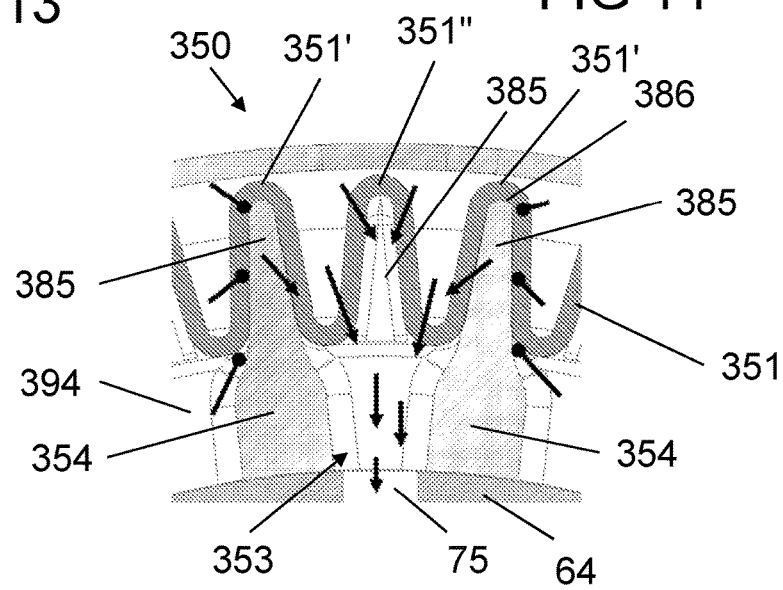
FIG. 15 shows the situation as regards flow in the backflush cycle at an aperture in the filter insert according to the invention schematically in a detail view.

The flow situation, resulting from the configuration of the filter insert 350, in the return-flow cycle is indicated in FIG. 15. The sectional view in FIG. 15 is such that the section is taken through the apertures 353 and ribs 354 of a group, wherein the ribs 354 enter by means of their rib fronts 385, illustrated in section, into two pleating folds 351', while a further pleating fold 351", which is not supported by means of a rib in the region of said group but is supported in the region of the adjacent group or groups by means of the rib front 385 of the rib 354 situated there, is situated in front of the aperture 353 of said group.

Although the arrangement of the apertures 353, ribs 354 and pleating folds 351' does not have an effect in the filtering mode, it has an effect in the backflush mode during a backflush cycle, and this will now be briefly explained. By way of example, FIG. 6 shows, schematically by means of the arrows, the backflush effect during a backflush cycle at a certain point in time. In the illustration according to FIG. 6, the hollow shaft 61 and hence the backflushing device 60 moves anticlockwise. Backflushing, i.e. cleaning the inside of the filtering means 351, takes place in the region of action of one single active aperture 353 in front of flushing chamber 64B, which is active at this point in time owing to the relative position of the hollow shaft 61 and the flushing device 60. In FIG. 6, backflushing is taking place at this time only at one of the apertures 353 in the lower group 353B of the upper subgroup. Admittedly, the slits 75 of both chamber modules 65 of the upper flushing chamber 64A are in alignment with the section of the radial outlet 69A of the hollow shaft 61. However, since the slot or slit 75 at the face of the upper flushing chamber 64A, which is embodied as a double chamber, is situated partially or completely in front of a rib 354, flushing of the filtering means 351 can take place only via that surface of the flushing chamber 64A which is currently free in this rotational position. However, if the hollow shaft 61 rotates further in the direction of motion, the flushing chamber 64A temporarily acts partially over the height of the slot or slit 75 in the upper flushing chamber 64A. As long as there is no change in the direction of motion, the radial outlets 69B in the hollow shaft 61 are angularly offset relative to the slits 75 of the flushing chamber 64B, for which reason no backflushing takes place in the lower subgroup during the movement of the backflushing device in this direction of rotation. Backflushing takes place during the backflush cycle because, as explained with reference to FIGS. 1 and 2, the backflush valve is opened whenever the rack of the actuating drive leaves its initial position in order to rotate the backflushing device 60, and the cavity 61' in the hollow shaft 61 is thereby connected to the flushing outlet.

In one direction of rotation, flushing of the folds 351' of the filtering means 351 is thus effected by means of the upper flushing chamber 64A in the region of the upper groups 353A, 353D of apertures 353. After a reversal of the direction of rotation of the backflushing device, for which purpose the rack of the actuating drive (cf. FIG. 1) is pulled back in the direction of the initial position, the backflushing action is shifted to the lower two groups 353C, 353D of apertures via the lower backflushing chambers 64B. In this case, there is first of all a relative rotation between the hollow shaft 61 and the flushing device 60 by movement of the hollow shaft in the opposite direction until the second stop (74B) on the driving means (74, FIG. 4) comes into contact with the associated flushing chamber 64A of the flushing device 60 and then takes the flushing device 60 along.

When backflushing of the aperture 353 takes place via the flushing gap 75 of the flushing chamber 64, indicated only schematically in FIG. 15, the filtering means 351 is pulled against the outer flank of the rib fronts 385 entering into the pleating folds 351' and designed as rib points, as indicated by the round heads of the lines, this taking place in the region of the group subject to the flushing cycle, whereby a bypass flow via adjacent pleating folds 351' is prevented in an effective manner and only the pleating fold 351" situated directly in front of the aperture 353 is subjected to the backflushing process, as indicated by the arrows. At the same time, the ribs 354 or rib fronts 385 in the region of the adjacent groups prevent a stray or bypass flow from above or below since, there too, the pleating fold 351" is supported by means of a rib point, namely the rib point of the ribs of the adjacent group. Each rib front 385 fits or enters completely by means of its rib point into the pleating fold 351' situated in front of it and extends over the entire depth of the pleating fold 351' as far as the bottom of the respective pleating fold. By means of the rounded front end 386, the rib point or rib front 385 is matched to the contour of the pleating fold 351'. Between two rib fronts 385 or ribs 354, it is also possible for the filter material additionally to come to rest against the outer wall of the base ring 394 by means of its pleating folds and to find further support there.

By means of just two different elements in this case it is possible to construct a supporting cage in modular fashion, it being possible without problems to arrange further pairs of ribbed elements between two end covers 391 in order to obtain a filter insert of axially greater length with, in that case, six groups of apertures, for example. For even longer overall sizes of filter inserts, further ribbed elements could be arranged in corresponding fashion, wherein ultimately the two end covers 391 are clamped together in such a way by means of anchor rods (59, FIG. 5) in such a way that the supporting cage, the pleated filter cloth and the supporting shell are enclosed between the end covers 391. By introducing an adhesive, the pleating of the filtering means can be enclosed between the end covers and the supporting cage in a manner which is radially sealed off. Instead of an adhesive bond, it would also be possible to provide a weld seam, or a sealing bead is moulded on. The anchor rods (59, FIG. 5) serve to provide additional stability, to create an insert which can be removed as a whole and to fix the element between the end covers, wherein one of the end covers can have the openings (58, FIG. 5) as integral features. After the reversal of direction, the same processes as those explained take place in principle, but in the region of the lower flushing chamber 64B in each case.

Figures 7, 8:
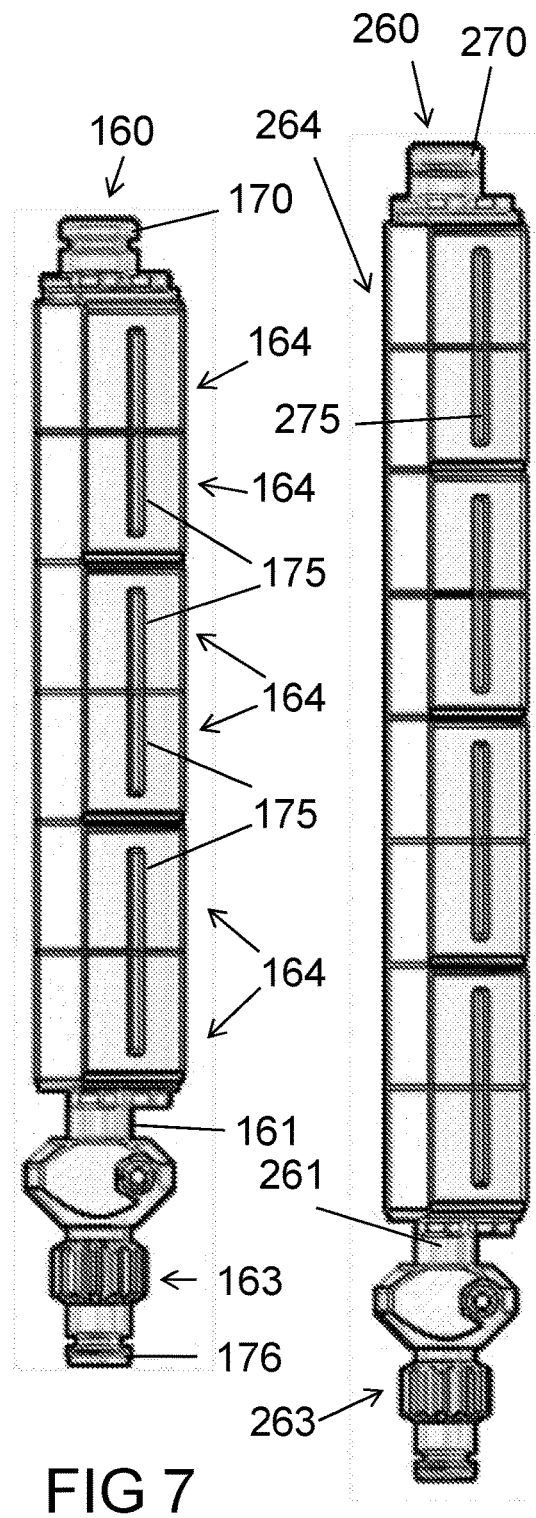
FIG. 7 shows a flushing device having three double flushing chambers.
FIG. 8 shows a flushing device having four double flushing chambers.
Figure 13:
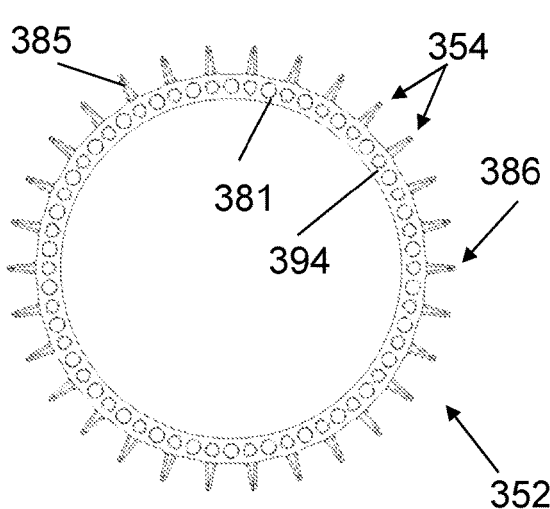
FIG. 13 shows a plan view of a ribbed element of the supporting cage according to FIG. 9.

The modular construction both of the supporting cage 352 and of the flushing device 60 makes it possible to increase the available filtering surface area in a relatively simple manner, using the same elements, by extension of the supporting cage and, correspondingly, a longer configuration of the backflushing device, in which case the housing is larger. FIG. 7 shows a backflushing device 160 with a total of 6 flushing chambers 164, of which in each case two are combined to form a double chamber, as described above, thereby giving rise to a total of three subgroups, namely an upper subgroup, a central subgroup and a lower subgroup, which each comprise two flushing chambers. As in the previous illustrative embodiment, the hollow shaft 161 is provided at the upper end with a bearing plug 170 including the driving means and at the lower end with a gearwheel 163 and a lower bearing stub 176. The radial outlets (not shown) in the hollow shaft 161 can be arranged in such a way that one of the two radial outlets is assigned to the three lowermost flushing chambers 164 together with the associated slit 175, while the higher radial outlet is assigned to the three upper flushing chambers 164 together with the associated slit 175. Depending on the arrangement of the apertures in the supporting cage, either one flushing chamber 164 or two flushing chambers 164 are active in the backflushing cycle in one direction of rotation. The radial outlets in the hollow shaft could also be arranged in a different way. Thus, the lower radial outlet could extend over the lower four flushing chambers, and the upper radial outlet could extend over just the upper two flushing chambers, thereby slightly increasing the flushing intensity at the upper two flushing chambers 164 and hence at the flushing chambers situated furthest away from the flushing valve as compared with the other flushing chambers.

FIG. 8 furthermore shows another illustrative embodiment of a backflushing device 260, in this case with a total of eight flushing chambers 264, the slits 275 of which are all arranged on a common axial line, as in the previous illustrative embodiment. As in the previous illustrative embodiments, the hollow shaft 261 is provided at the lower end with a gearwheel 263 and at the upper end with a bearing plug 270. It would also once again be possible to provide just two radial outlets in the hollow shaft 261, with each radial outlet extending over a total of four flushing chambers 264. Of course, it would also be possible for four radial outlets to be provided, with in each case two radial outlets being arranged on the same axial line and the other two radial outlets being positioned in the hollow shaft in a manner offset by the predetermined angle.

Figure 16:
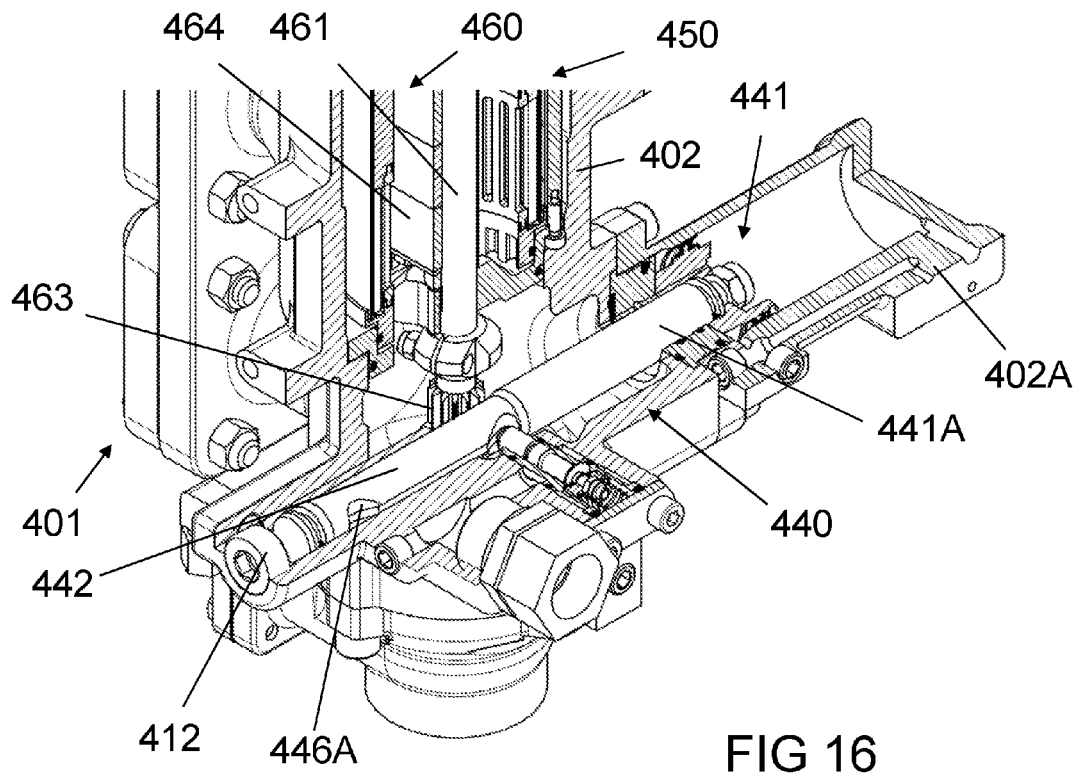
FIG. 16 shows a backflush filter according to the invention having an actuating drive according to a second variant embodiment in a schematically simplified perspective view, which is partially cut away.
Figure 17:
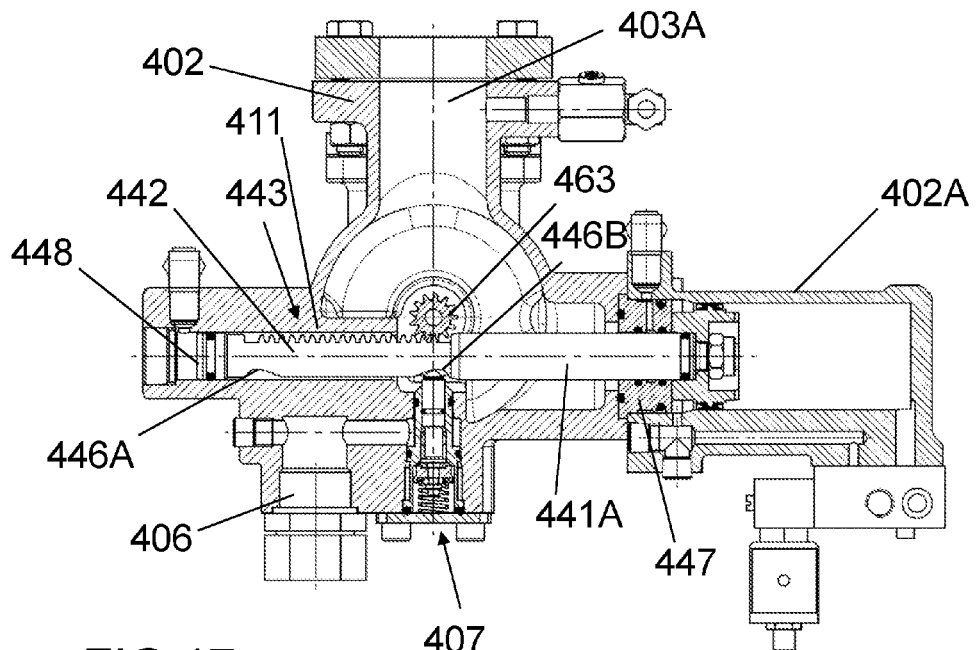
FIG. 17 shows a horizontal section through the actuating drive in the backflush filter from FIG. 16.

FIGS. 16 to 18 show an alternative illustrative embodiment of an actuating device 440 of a backflushing device 460 in a backflush filter 401 illustrated only in part. Here too, the backflush filter 401 has a filter housing 402, which in the interior guides the medium to be filtered and in which all the functional parts for the filtering mode and the backflush mode are arranged and, for this purpose, is provided with a filter inlet, a filtrate outlet 403A, a flushing connection 406 and a filter insert 450, through which the medium to be filtered flows. Once again, the backflushing device 460 has a hollow shaft 461 arranged rotatably in the interior of the filter insert 450, a flushing chamber 464, which, although it can be taken along in both directions of rotation with the hollow shaft can be moved freely to a limited extent relative to the latter and without being taken along, and a gearwheel 463, which is connected for conjoint rotation to the hollow shaft 461 and which meshes with a set of teeth of a row of teeth 443 on a rack 442, which forms part of the actuating device 440. Attention is drawn to the above description.

The rack 442 is connected to a slide piston 441A of a piston-type linear actuator arrangement 441 that can be moved pneumatically in both directions, wherein the slide piston 441A is guided and supported during its entire sliding motion in a sliding guide 447, which seals off the pneumatic drive, which is implemented by means of the piston-type linear actuator and is arranged in an additional housing 402A, from the interior of the actual filter housing 402.

The rack 442 is provided on the flank 445 opposite the set of teeth 443 with two mutually spaced cam surfaces 446A, 446B, by means of which it is ensured, for each point of reversal of the sliding motion of the rack 442, that the flushing valve 407 assigned to the flushing outlet 406 adopts its closed position, for which purpose both cam surfaces 446A, 446B consist of a recess with an oblique entry surface on the flank. This flank 445 is furthermore provided with a guide groove as an axial guide or anti-rotation safeguard for the rack 442. That end of the rack 442 which is on the left in FIGS. 16 and 17, which is free relative to the end of the rack 442 coupled to the pneumatic drive, is here designed as an annular guide boss 448 with an O-ring as a sealing ring, by means of which this end of the rack 442 is guided in an associated location hole 411 in the filter housing 402, wherein the guide boss 448 together with the O-ring forms a sliding guide which seals off the interior of the backflush filter 401 through which the medium to be filtered flows from the free space in the location hole 411, said free space being situated in front of the guide boss. Although the location hole 411 is closed at the end in the housing wall of the filter housing 402 by means of a screw 412, a bleed hole opens into the location hole between the guide boss 448 and the screw 412 to ensure that no forces dependent on the operating pressure of the medium to be filtered counteract the sliding motion of the rack. Bleeding can also be achieved via the screw 412.

The mode of operation of the rack 442 and of the flushing valve 407 are most clearly apparent from FIG. 18, in which three different possible switching states dependent on the position of the rack 442 relative to the valve 407 are shown simultaneously. In the two outer illustrations of the flushing valve 407, said valve is closed and no fluid can cross from the backflushing device into the flushing outlet (compare FIGS. 16 and 17). The spherical head of the valve tappet 408 in each case projects into one of the two cam surfaces 446A, 446B consisting of depressions, for which reason the valve seat in the flushing valve 407 is closed because the spring 409 preloads the valve tappet 408 in a corresponding manner. The left-hand position of the flushing valve 407 in FIG. 18 preferably corresponds to the rest position or initial position in the filtering mode. If the actuating device 440 is then actuated to backflush the filter insert 450, the rack 442 is moved in arrow direction A by means of the pneumatic drive, as a result of which the gearwheel 463 rotates clockwise, and the hollow shaft (compare FIG. 16) also rotates clockwise as a result. As explained with reference to the previous embodiment, the flushing chambers (464, FIG. 16) positioned in the interior of the filter insert (450, FIG. 16) can thereby be taken along in the direction of rotation—in general after traversing the angular offset between the two radial outlets (or radial inlets) in the hollow shaft—as a result of which one of the two groups of apertures in the filter insert is cleaned or backflushed. At the beginning of the sliding movement, the flushing valve 407 is still closed. As soon as the head of the valve tappet 408 reaches the oblique surface on the cam 446A, the flushing valve 407 begins to open and remains in this open position, as shown in the central illustration of the flushing valve 407 in FIG. 18, until the rack 442 has approximately reached its end position corresponding to the right-hand illustration in FIG. 18. As it enters the switching cam 446B, the head of the valve tappet 408 runs gradually along the oblique surface to the maximum depth in the switching cam 446B, as a result of which the flushing valve 407 closes (right-hand flushing valve in FIG. 18). During the reversal of direction, the flushing valve 407 remains closed, it being possible for the duration to be determined by means of the curve geometry of the switching cam 446B. After the reversal of direction, the rack 442 moves in arrow direction B, as a result of which the gearwheel 463 rotates anticlockwise. It is preferably only if the angular offset of the radial outlets in the hollow shaft has been traversed again and the flushing chambers have been taken along again in the direction of rotation that the head of the valve tappet 408 reaches a position in the cam surface of the switching cam 446B in which the flushing valve 407 opens. Since the flank 445 between the two switching cams 446A, 446B extends in a manner aligned parallel to the direction of the slide, the flushing valve 407 retains its open position shown in the central illustration in FIG. 18. The closure of the flushing valve 407 during the reversal of movement further reduces the quantity lost during backflushing.

The construction, shown in FIGS. 16 to 18, of the flushing device together with the actuating device can be used to advantage in all the embodiments of the filter insert described above. FIGS. 19 to 21 show another modification of the construction of the filter insert and of the supporting cage 452 for the filter insert. Here, the supporting cage 452 comprises four ribbed elements 493 of identical design, each ribbed element 493 having the construction shown in FIGS. 20 and 21. Each ribbed element 493 has two base rings 494, on the radial outer sides of which mutually parallel and circumferentially offset ribs 454 are required or arranged. If the ribbed element comprises a moulding made of plastic (or metal), all the ribs 454 can be formed integrally on the two base rings 494. However, the ribbed elements can also be assembled, bonded together or welded together from separately produced rings and ribs. An aperture 453 is formed between each pair of ribs 454, wherein the ribs 454 extend as far as the inner circumference of the base rings 494, as FIG. 21 clearly shows. The respective face 481 of each base ring 494 which faces away from the other base ring 494 is provided alternately with locking pins 482 and locking holes 483, wherein the positioning of the locking pins 482 on the two faces 481 is such that the locking pins 482 are an axial extension of one another and the locking holes 483, too, are situated on the two base rings 494 as an axial extension of one another. Consequently, each ribbed element 493 is mirror-symmetrical with respect to an imaginary centre plane between the two base rings 494. Furthermore, all the ribs 454 project in an axial direction beyond the faces 481 provided with the locking holes 483 and locking pins 482, in this case by an amount corresponding to the thickness (in the axial direction) of the base ring 494. When a plurality of ribbed elements 493 are assembled, such a construction in each ribbed element 493 automatically leads to the apertures 453 on one of these ribbed elements 493 lying on an axial extension of a rib 454 on the adjacent ribbed element 493, as can be seen from FIG. 19, as a result of which the angular offset of the apertures 453 of one group relative to the apertures 453 of the adjacent group is achieved. The ribbed element 493 shown in FIGS. 20 and 21 has a number of locking holes 483 and locking pins 482 corresponding to the number of ribs 454; however, it would also be possible for fewer interacting locking means to be provided, for example.

A pleated filtering means is then supported in each case by one rib 454, at least on one side and, in the case of the central ribbed elements 493, also on both sides of an aperture 453, wherein the respective rib fronts 485 of the ribs 454 enter into the bottom of the fold of the pleated filtering means (not shown). It is self-evident that the ribbed elements 493 on the supporting cage 452 are preferably also enclosed or arranged between end covers.

Numerous modifications which fall within the scope of protection of the attached claims can be obtained from the preceding description by a person skilled in the art. Instead of the embodiment shown, the rack can be provided with two cam surfaces as switching cams for actuating the flushing valve, wherein the first switching cam serves to actuate the flushing valve in the initial position of the rack and the second cam surface serves to actuate the flushing valve in the reverse position of the rack or of the actuating drive. The cam surfaces can each consist of recesses into which a head of the flushing valve enters for closure. The rack could furthermore also be guided, in particular guided in a sealed manner, in a guide on the housing at its free end remote from the drive with the result that the motion of the rack and, especially, of the rack head is independent of the operating pressure. The filter insert with the described construction of the supporting cage and with the pleated filter fabric can also be used with other kinds of backflush filter, if appropriate, and is not restricted to use with the backflush filter shown in the figures. The filtering means can be of single- or multi-ply construction. The number of apertures, the angular offset of the radial outlets and hence the required limited rotary mobility between the hollow shaft and the flushing chambers can vary. The supporting cage can contain just two or four ribbed elements, which are arranged between two end covers. By stacking a plurality of ribbed elements, it is then possible to adapt to different filter surface areas and overall lengths of the filter insert and of the backflushing device. One ribbed element in each case can also form a module which has two integral base rings and is then used completely to form a group or subgroup, wherein it is possible, by angularly offset assembly of said modules, to achieve the offset between the ribs and apertures in one group and those of the adjacent group in corresponding fashion. Instead of using locking pins and locking holes, the individual ribbed elements can also be fixed to one another by using other connecting means. Arranging a pleated filter fabric in such a way that the rib enters at least partially into each fold is the preferred embodiment. However, operation is at most impaired if the number of folds and ribs is different. Thus, in particular, it is possible for there to be more pleating folds than ribs with rib fronts entering into the pleating folds. Consequently, it is also possible for two, three or more pleating folds to be situated in front of an aperture between two ribs, wherein not all the pleating folds are supported by a rib front of a rib in the adjacent group or group(s). It would also be possible to couple the driving means and the gearwheel for conjoint rotation to the flushing chambers and then to take the hollow shaft along as a passive element. The sealing of the supporting cage and of the filtering means between the end covers can be accomplished in different ways.

The figures each show the embodiment of a filter insert, in particular the preferred embodiment of a filter insert, in which the slot-type apertures of one group are arranged offset relative to those of the other group(s) and the apertures of one group lie in a common plane with the ribs of the other group(s). In the case of a filter insert with a pleated filtering means, however, it is admittedly advantageous if all the ribs each fit by means of a rib front into a pleating fold, even if all the apertures are situated as an axial extension of one another or lie in a common plane.

Such modifications and other modifications are intended to fall within the scope of protection of the attached claims. Moreover, the illustrative embodiments shown represent only preferred embodiments without restricting the scope of protection thereto. Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A backflush filter for liquid media, the backflush filter having a filter housing that has a filter inlet, a filter outlet and a flushing connection, the backflush filter having a filter insert, being fixedly arranged in the filter housing, flowable through by an associated medium to be filtered from the inside to the outside and formed by at least one supporting cage, which has at least two groups of slot-type apertures, and at least one filtering means supported on the supporting cage, the apertures within each group of the at least two groups extend in parallel alignment with one another and are separated from one another by mutually parallel ribs of the at least one supporting cage, and the backflush filter having a backflushing device, which is arranged in the interior of the filter insert, is rotatable in the filter insert about an axis by an actuating drive, has at least one slit and extends over the height of the filter insert, the backflushing device serving for zone-wise flushing of the filtering means via the slit and apertures and for carrying filter residues to the flushing connection during a backflush cycle, the slot-type apertures of one of the at least two groups are arranged offset relative to those of the other of the at least two groups, and the apertures of the one group lie in a common plane with the ribs of the other groups, the backflushing device further including at least two mutually separate flushing chambers, arranged vertically offset relative to one another and having associated slits, and a hollow shaft, which is capable of limited rotary motion relative to the flushing chambers and the hollow shaft has a first radial outlet in a region of the first flushing chamber and a second radial outlet in a region of the second flushing chamber, which second radial outlet is arranged on the hollow shaft in a manner vertically offset and circumferentially offset relative to the first radial outlet, the direction of movement of the backflushing device can be reversed by the actuating drive during the backflush cycle, and driving means for simultaneous movement of the flushing chambers and the hollow shaft in the respective direction of motion after a reversal of direction and for rotation of the hollow shaft and the flushing chambers relative to one another are provided for both directions of motion, the filtering means comprising a pleated filter fabric or filter cloth with pleating folds, and the ribs fit with a rib front into respective pleating folds.

2. The backflush filter according to claim 1, wherein the hollow shaft is coupled for conjoint rotation to the actuating drive, wherein coupling is accomplished by a geared mechanism.

3. The backflush filter according to claim 1, wherein the actuating drive comprises a rack capable of linear motion, which meshes with a gearwheel coupled to the backflushing device for rotation of the backflushing device, wherein, a flushing valve is openable and closable by a movement of the rack and is in fluid connection with a sludge outlet.

4. The backflush filter according to claim 3, wherein the rack is provided on its end face with at least one cam surface as a switching cam for actuating the flushing valve, wherein the flushing valve is movable into an open position during the backflush cycle by the rack, counter to the restoring force of a return spring.

5. The backflush filter according to claim 3, wherein the rack is provided with first and second cam surfaces as switching cams for actuating the flushing valve, wherein the first cam surface serves to actuate the flushing valve in the initial position of the rack and the second cam surface serves to actuate the flushing valve in the reverse position of the rack or of the actuating drive, wherein both ends of the rack are at least one of guided and supported in respective sliding guides, which, irrespective of the sliding position, effect sealing relative to the filter housing through which the associated medium can flow.

6. The backflush filter according to claim 1, wherein at least one of the flushing chambers are rotatable by at least 360° in both directions of motion by an actuating device during a backflush cycle, and each flushing chamber and the associated slit having a height which is matched to the height of the slot-type apertures of a first group or of a second group, and the flushing chambers comprise chamber modules of the same type which are connected detachably to one another, wherein two chamber modules in each case are assembled to form a double chamber, wherein all the chamber modules are connected by way of through-rods to form a flushing chamber insert, which is supported with the ability for partial rotary motion on the hollow shaft.

7. The backflush filter according to claim 1, wherein the filter insert has a plurality of subgroups, wherein each subgroup comprises a group of first apertures and a group of second apertures, and the hollow shaft has precisely two radial outlets positioned in a circumferentially offset and vertically offset manner, wherein the first radial outlet is assigned to an uppermost subgroup and the second radial outlet is assigned to a lower subgroup.

8. The backflush filter according to claim 1, wherein at least one of each pleating fold is assigned a plurality of apertures of different groups of first apertures or of second apertures, and the rib front of each rib extending as far as a fold base of a pleating fold.

9. The backflush filter according to claim 1, wherein at least one of all the ribs extend radially and are formed symmetrically with respect to a radial plane, and the rib front of each rib is designed as a rib tip tapering to a free front end thereof wherein the front end is rounded.

10. The backflush filter according to claim 1, wherein the supporting cage is of modular construction and has a plurality of mutually identical annular ribbed elements, which are enclosed between two end covers, wherein each ribbed element has at least one base ring, on which a plurality of ribs positioned in a manner circumferentially offset relative to one another are integrally formed or fixed, wherein the supporting cage has an even number of ribbed elements and two ribbed elements in each case form a ribbed element pair, these being clamped between the end covers with their base rings or rib ends abutting one another, wherein the ribs of the ribbed elements are furthermore provided alternately at their free rib ends with integrally formed locking pins or locking holes, and the base ring is provided alternately on one face with locking pins and locking holes, which interact in the assembled state.

11. The backflush filter according to claim 1, wherein the supporting cage is of modular construction and has a plurality of mutually identical annular ribbed elements, which are enclosed between two end covers, wherein each ribbed element has two base rings, on which a plurality of ribs positioned in a manner circumferentially offset relative to one another and connecting the base rings to one another are integrally formed or fixed, wherein each base ring is provided in such a way, on its face facing away from the other base ring, with alternate locking pins and locking holes that each ribbed element is formed in mirror symmetry with respect to a mirror plane between the two base rings.

12. The backflush filter according to claim 10, wherein the rib fronts of the plurality of ribs extend radially outside the base ring or base rings, wherein the rib fronts project upwards and downwards on both sides beyond the faces of the base ring or base rings, wherein the rib fronts project beyond the face of the base ring or base rings which is provided with the locking holes, the projection corresponding to the thickness thereof in the axial direction.

13. A filter insert according to claim 1, having the supporting cage for supporting the filtering means, wherein the supporting cage has at least two groups of slot-type apertures, which, within each group, extend in parallel alignment with one another and are separated from one another by mutually parallel ribs of the supporting cage, wherein the slot-type apertures of one group are arranged offset relative to those of the other group(s), and the apertures of one group lie in a common plane with the ribs of the other group(s), wherein the filtering means comprises a pleated filter fabric or filter cloth with pleating folds, and the ribs fit with a rib front into respective pleating folds.

14. The filter insert according to claim 13, wherein at least one of each pleating fold is assigned a plurality of apertures of different groups of first apertures or of second apertures, and the rib front of each rib extending as far as the fold base of a pleating fold.

15. The filter insert according to claim 13, wherein at least one of all the ribs extend radially and are formed symmetrically with respect to a radial plane, and the rib front of each rib is designed as a rib tip tapering to a free front end thereof wherein the front end is rounded.

16. The filter insert according to claim 13, wherein the supporting cage is of modular construction and has a plurality of mutually identical annular ribbed elements, which are enclosed between two end covers, wherein each ribbed element has at least one base ring, on which a plurality of ribs positioned in a manner circumferentially offset relative to one another are integrally formed, wherein at least one of the supporting cage has an even number of ribbed elements, and two ribbed elements in each case form a ribbed element pair, these being clamped between the end covers with their base rings or rib ends abutting one another, wherein the ribs of the ribbed elements are provided alternately at their free rib ends with integrally formed locking pins or locking holes, and the base ring is provided alternately on one face with locking pins and locking holes, which interact in the assembled state.

17. The filter insert according to claim 13, wherein the supporting cage is of modular construction and has a plurality of mutually identical annular ribbed elements, which are enclosed between two end covers, wherein each ribbed element has two base rings, on which a plurality of ribs positioned in a manner circumferentially offset relative to one another and connecting the base rings to one another are integrally formed or fixed, wherein each base ring is provided in such a way, on its face facing away from the other base ring, with alternate locking pins and locking holes that each ribbed element is formed in mirror symmetry with respect to a mirror plane between the two base rings.

18. The filter insert according to claim 16, wherein the rib fronts of the ribs extend radially outside the base ring or base rings, wherein the rib fronts project upwards and downwards on both sides beyond the faces of the base ring or base rings, wherein the rib fronts project beyond the face of the base ring or base rings which is provided with the locking holes, the projection corresponding to the thickness thereof in the axial direction.

* * * * *